May 17, 1949.  C. F. VOYTECH  2,470,419
BALANCED, COOLED AND LUBRICATED ROTARY SEAL
Filed Jan. 12, 1948

INVENTOR.
Charles F. Voytech
BY.

Patented May 17, 1949

2,470,419

UNITED STATES PATENT OFFICE 2,470,419

BALANCED, COOLED, AND LUBRICATED ROTARY SEAL

Charles F. Voytech, Chicago, Ill., assignor to Crane Packing Company, Chicago, Ill., a corporation of Illinois Application January 12, 1948, Serial No. 1,854

6 Claims. (Cl. 286—9)

This invention relates to rotary mechanical seals which are balanced and cooled, and which may also be lubricated.

The principal object of this invention is to provide a balanced rotary seal which is cooled and lubricated and yet is of simpler construction than those heretofore proposed.

A specific object of this invention is to provide a balanced, cooled washer for a mechanical seal wherein the washer is not required to rotate and yet is free to move axially to compensate for wear or axial vibrations of the shaft.

Another specific object of this invention is to provide a double seal of the mechanical rotary type wherein but one spring or one set of springs is used to maintain both seals in contact with a relatively rotatable seat.

Another specific object of this invention is to provide a double seal for rotary apparatus such as pumps or the like, which seal is very compact so that it does not require a very great axial space in which to operate.

Yet another specific object of this invention is to provide a rotary seal of the balanced lubricated type which is easy to assemble and which does not require any very great accuracy in locating it in the equipment to be sealed.

Figure 1:
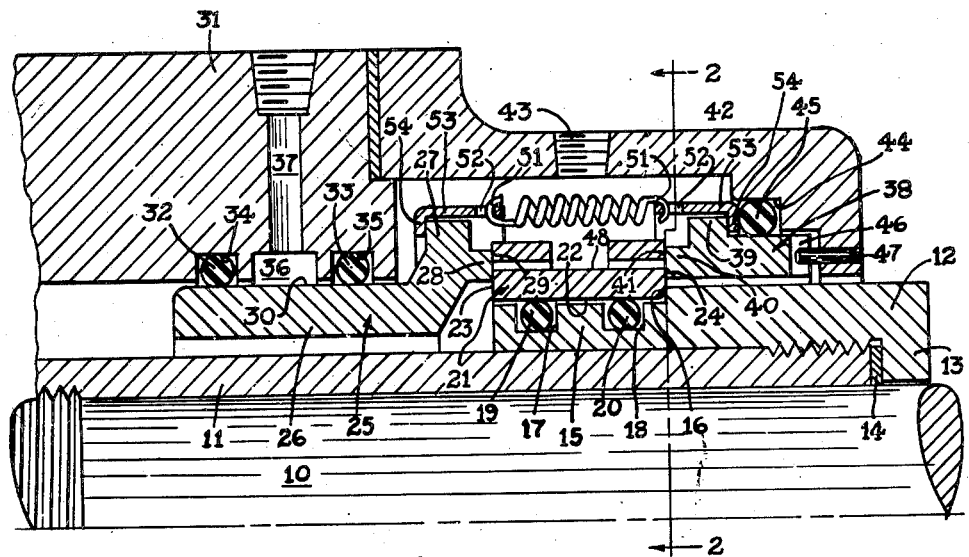
Figure 2:
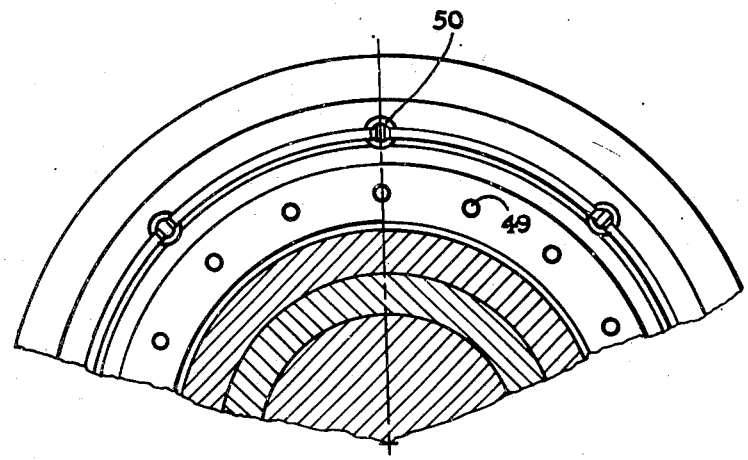

These and other objects of this invention will become apparent from the following detailed description when taken together with the accompanying drawings, in which Fig. 1 is a quarter-sectional view through a seal incorporating the object and features of this invention; and Fig. 2 is a fragmentary section taken along line 2—2 of Fig. 1 showing the disposition of the springs and lubricating openings in the seal.

Referring now to Fig. 1 for a detailed description of the invention, there is shown at 10 a shaft which may be the shaft of a centrifugal pump for propane or like fluids which have been found to be difficult to seal, and a sleeve 11 which is threaded on shaft 10 so as to be rotatable therewith and is sealed with respect thereto. Such sleeves 11 are in common use in existing pumps which are designed to use ordinary packing instead of mechanical seals. The sleeve 11 serves in such cases to take whatever wear and scoring resulting from the use of packing and thereby saves the shaft 10. Where a pump is not designed primarily to be sealed by means of packing, sleeve 11 may be eliminated and the seal hereinafter described may be considered as operating directly on shaft 10.

Threaded on sleeve 11 is an outer sleeve 12 having a radially inwardly extending flange 13 which serves to compress a suitable ring of packing 14 against the end of sleeve 11. The outer sleeve 12 is sealed with respect to sleeve 11 and the latter, as stated above, is sealed with respect to shaft 10. Sleeve 12 has a portion 15 of somewhat reduced diameter so that a shoulder 16 is formed. In the reduced portion 15 there are formed two grooves 17 and 18 in which are disposed endless rings 19 and 20, respectively, of resilient, deformable material, such as rubber, either natural or synthetic or a combination of the two, each ring being of substantially circular radial cross-section, the axial dimension of which is slightly smaller than the axial dimension of each groove so that the ring is free to move to a limited extent in the groove. Such rings are generally known to the trade as O rings. Encircling reduced portion 15 is a collar 21 which compresses rings 19 and 20 in their grooves and causes them to effect a fluid-tight seal between collar 21 and sleeve 12. The inner surface 22 of collar 21 is preferably made cylindrical and perfectly smooth so that collar 21 may be readily pushed axially over springs 19 and 20 when the seal is being assembled.

Collar 21 has radially disposed surfaces 23 and 24 which are ground and lapped so as to be perfectly flat and smooth. These surfaces 23 and 24 are used as sealing surfaces.

Cooperating with collar 21 and to the left thereof as viewed in Fig. 1 is a sealing washer 25 having a substantially cylindrical portion 26, a radially outwardly extending flanged portion 27 and an axially extending bead 28. The radially disposed surface 29 of bead 28 is ground and lapped so as to be perfectly flat and smooth and to form a fluid-tight joint with surface 23 of collar 21. The outer surface 30 of washer 25 is preferably made cylindrical and of a diameter which is substantially equal to the smallest diameter of bead 28. Washer 25 is supported from the pump housing 31 by a pair of endless rings 32 and 33 preferably made of resilient, deformable material, such as rubber, either natural or synthetic, or a combination of the two, said rings being retained in grooves 34 and 35, respectively, formed in housing 31. Rings 32 and 33 preferably have a circular radial cross-section and the axial dimension of each of the grooves 34 and 35 is such that rings 32 and 33 can roll slightly in the grooves to prevent them from sticking therein. It is contemplated that washer 25 may have a limited axial movement relative to housing 31 and such rolling therefore is necessary so as to minimize impedence to such axial movement.

Where the pump is used for pumping relatively hot fluids, it is desirable to cool washer 25 to prevent it from deteriorating rapidly and failing much sooner than would be ordinarily expected. To this end a cooling means is provided in the form of a groove 36 located in the space between rings 32 and 33 and adjacent to sealing washer 25. An inlet passage 37 connects groove 36 with the exterior of housing 31 and it is contemplated that a similar passageway (not shown) will be provided at substantially 180° from passageway 37. A coolant such as water may then be passed through passage 37 into groove 36 and out to convey with it the heat removed from washer 25.

It is contemplated that the seal will also be lubricated by means of an external reservoir of oil or the like. A second seal is therefore provided, said seal comprising sealing washer 38 which has a radially extending flange 39 and an axially extending bead 40, said bead 40 having a radially disposed surface 41 which is ground and lapped so as to be perfectly flat and smooth. Said surface 41 is adapted to form with surface 24 of collar 21 a fluid-tight running fit. The lubricant is contained in a cup-shaped housing 42 which surrounds both seals and is secured to housing 31 by bolts or the like (not shown). An opening 43 is provided in housing 42 for a fitting through which the lubricant may be inserted. A counterbore 44 is formed in housing 42 and an endless ring 45 of resilient, deformable material and having a circular radial cross-section is compressed between washer 38 and counterbore 44 so as to form a fluid-tight seal between the washer and housing. The axial lengths of the washer and the counterbore are such that washer 38 may move axially relative to housing 42 without destroying the seal established by ring 45. One or more notches 46 is formed in washer 38 into which projects a pin 47 secured to housing 42. Pin 47 prevents washer 38 from rotating relative to housing 42.

In order to make sure that the lubricant reaches the relatively rotating seal surfaces 23, 29, 24 and 41, collar 21 is formed with a central groove 48 which communicates with axially extending openings 49 (Fig. 2) the purpose of which is to conduct the lubricant directly to the seal surfaces. Thus a constant supply of lubricant is maintained at the seal surfaces and due to centrifugal force the lubricant will pass radially outwardly across the seal faces, thereby tending to decrease friction and wear.

Washers 25 and 38 are maintained at all times in contact with collar 21 by means of a plurality of springs 50. Said springs 50 are tension springs formed with loops 51 at the ends thereof which are hooked into openings 52 in identical cylindrical stampings 53 having abutments which may be in the form of flanges 54 abutting on flanges 27 and 39, respectively, and washers 25 and 38. It is understood that any form of abutment will be satisfactory in place of the flanges so long as the abutment is sufficiently strong to withstand the tension of the springs. Thus the tension of the springs will hold the washers against collar 21 despite wear of the cooperating surfaces and despite any vibration which may occur between the collar 21 and housings 31 and 42. The number of springs used depends upon the pressure it is desired to exert upon the sealing surfaces. The tension springs, however, are capable of exerting considerable force in a very small space and hence will be very efficient. When used as shown they will be stationary and hence centrifugal force need not be a factor in their design.

Inasmuch as the diameter of outer surface 30 of washer 25 is exactly equal to the inside diameter of bead 28, any fluid pressure exerted axially upon the interior of washer 25 will be substantially balanced and hence will not be transmitted to surfaces 29 and 23. If, however, it is desirable to assist springs 50 in holding washer 25 against collar 21, the diameters of surfaces 30 and bead 28 may be varied so as to get the desired direction and quantity of net fluid pressure. Collar 31 will, of course, be subject to the pressure of the fluid to be sealed and this pressure will tend to force the collar to the right as viewed in Fig. 1 until it abuts on shoulder 16. This pressure will then be taken by outer sleeve 12 and transmitted through inner sleeve 11 to shaft 10. This pressure on shaft 10 may be balanced elsewhere in the pumping mechanism.

It is contemplated that the pressure of the lubricant will not be very great and hence its effect on washers 25 and 38 may be disregarded.

The double rings 19 and 20 are used to also develop enough friction between collar 21 and outer sleeve 12 to prevent relative rotation therebetween. Where collar 21 is modified so that a positive drive such as pin 27 is used, a single ring 19 may be sufficient since its function then is merely to act as a seal.

The greater portion of the seal may be assembled at the seal manufacturer's plant. The first step in the assembly is to insert a pair of sealing rings 19 and 20 into grooves 17 and 18 of a sleeve 12. The collar 21 is then pushed over the sealing rings 19 and 20 until it abuts on shoulder 16. Next, washers 25 and 38 are placed adjacent to collar 21 and the spring-holding stampings 53 are slipped over flanges 27 and 39. The springs 50 are then hooked into openings 52 and the assembly is ready for insertion into housings 31 and 42. At this stage, rings 32, 33 and 45 are inserted in their respective grooves and counterbores and housing 42 is then assembled with respect to the said assembled washers and collar in such a manner that pin 47 will enter notch 46. The bolts which are to secure housing 42 to housing 31 are then lined up with their threaded openings and the entire assembly is pushed axially against housing 31, washer 25 at that time being slid into rings 33 and 32. While the assembly is being advanced toward housing 31, sleeve 12 is threaded on sleeve 11 and this latter action continues until sleeve 12 can no longer be advanced, which means that packing ring 14 is tight and a fluid-tight joint has been made between sleeves 11 and 12. The last step is to make housing 42 secure against housing 31.

The materials from which the collar 21 and washers 25 and 38 are made depends upon the fluids to be sealed and the speed of rotation of collar 21. Thus for propane, washers 25 and 38 may be made from carbon and collar 21 may be made from Stellite or other hard ferrous materials.

In operation, collar 21 will be rotated by sleeves 11 and 12, and washers 25 and 38 will be stationary in a circumferential direction, but said washers will always be held in contact with collar 21 by springs 50. Any wear which takes place between the collar and washers will be taken up by the springs. Axial movement of collar 21 will cause one washer to be pushed directly and the other washer will be made to follow the collar by the springs. Sufficient clearance is provided between the housings 42 and 31 and the washers to permit the seal assembly to float axially as required by collar 21. The fluid pressure on collar 21 is not transmitted to washer 38 but is taken by sleeve 12 and thus the principal force acting on washer 38 is the spring pressure. Washer 25 is substantially balanced and hence the spring pressure will likewise be the principal force acting upon it. It is understood that washer 25 may be held against rotation by pins somewhat similar to the pins 47.

The broad combination of a double seal with cooling means for one washer and lubrication for both seals, the greater portion of the double seal being outside the main housing, is disclosed and claimed in a copending application of Frank E. Payne, Serial No. 9,084, filed February 18, 1948.

It is understood that the foregoing description is illustrative of preferred embodiments of this invention and that the scope of the invention is not to be limited thereto, but is to be determined by the appended claims.

What is claimed is:

1. A fluid seal device for effecting a fluid-tight seal between a rotatable shaft and a housing therefor, said seal comprising a collar on the shaft and rotatable therewith, said collar having a pair of substantially radially disposed sealing surfaces disposed one on each side thereof, a sealing washer on each side of the collar, a radially outwardly extending abutment on each washer, a pair of cylindrical shells, one extending over each washer, an abutment on each shell adapted to bear against the abutment on the washer, and resilient means connecting the shells whereby to hold the washers against the collar.

2. A fluid seal device for effecting a fluid-tight seal as described in claim 1, one of said washers having an axially extending bead on which is formed a substantially radially disposed sealing surface which contacts one of the sealing surfaces of the collar, flexible means for effecting a seal between the washer and housing, and means on the housing for taking the axial thrust on the flexible sealing means, the inside diameter of the sealing surface on the bead being of a predetermined size relative to the smallest diameter of the flexible sealing means such that fluid pressure on the said one washer is at least partially balanced.

3. A fluid seal device for effecting a fluid-tight seal as described in claim 1, said collar being movable axially relative to the shaft and being partly exposed to the axial pressure of the fluid to be sealed, and an abutment on the shaft for holding the collar against axial movement in response to fluid pressure whereby to prevent the transmission of fluid pressure to the other sealing washer.

4. A fluid seal device for effecting a fluid-tight seal as described in claim 1, a removable housing adapted to be secured to the first-mentioned housing and enclosing the collar and washers and forming therewith a separate chamber, a counterbore in the chamber in proximity to one of said washers, and a ring of resilient deformable packing material compressed in said counterbore by the said washer and forming a fluid-tight seal between the washer and removable housing, the abutment on the shell extending over the said washer being interposed between the packing ring and the abutment on the said washer.

5. A fluid seal for effecting a seal between a shaft and a housing therefor, said seal comprising an abutment on the shaft, said abutment having a radially disposed sealing surface, an axially movable sealing washer having a cylindrical outer surface thereon, said housing having a cylindrical opening adjacent said cylindrical surface and having spaced grooves in the opening, packing material in said grooves and forming a fluid-tight seal between the housing and the cylindrical surface on the washer, means for introducing a coolant into the space around the washer between the packing in the grooves, said washer having an annular sealing surface in contact with the sealing surface on the abutment, the internal diameter of the said annular sealing surface being substantially the same as the cylindrical outer surface on the washer, whereby substantially to balance the fluid pressure acting on the washer, and resilient means holding the washer against the abutment, said abutment comprising a collar encircling the shaft, a sleeve rotatable with the shaft and having a shoulder against which the collar is adapted to bear, a groove in the sleeve, an endless ring of resilient deformable material compressed in the groove so as to form a fluid-tight seal therewith and means for locating the sleeve on the shaft.

6. A fluid seal for effecting a seal between a shaft and a housing therefor, said seal comprising an abutment on the shaft, said abutment having a radially disposed sealing surface, an axially movable sealing washer having a cylindrical outer surface thereon, said housing having a cylindrical opening adjacent said cylindrical surface and having spaced grooves in the opening, packing material in said grooves and forming a fluid-tight seal between the housing and the cylindrical surface on the washer, means for introducing a coolant into the space around the washer between the packing in the grooves, said washer having an annular sealing surface in contact with the sealing surface on the abutment, the internal diameter of the said annular sealing surface being substantially the same as the cylindrical outer surface on the washer, whereby substantially to balance the fluid pressure acting axially on the washer, and resilient means holding the washer against the abutment, said abutment comprising a collar having an external groove and passages extending from the groove to the sealing surface on the abutment whereby to conduct lubricant to the sealing surface.

CHARLES F. VOYTECH.

REFERENCES CITED

The following references are of record in the file of this patent:

UNITED STATES PATENTS

| Number | Name | Date |
| --- | --- | --- |
| 1,294,620 | Clarke | Feb. 18, 1919 |
| 2,247,505 | Kohler | July 1, 1941 |
| 2,265,953 | Mortensen et al. | Dec. 9, 1941 |
| 2,297,320 | Hornschuch | Sept. 29, 1942 |
| 2,307,755 | Beckwith | Jan. 12, 1943 |
| 2,366,629 | Kohler | Jan. 2, 1945 |